(12) United States Patent
Rao

(10) Patent No.: US 8,423,019 B2
(45) Date of Patent: Apr. 16, 2013

(54) DETERMINATION OF CARRIER FREQUENCY SCANNING PRIORITY IN COMMUNICATIONS

(75) Inventor: Anil M. Rao, Wheaton, IL (US)

(73) Assignee: ALCATEL LUCENT, Paris (FR)

(*) Notice: Subject to any disclaimer, the term of this patent is extended or adjusted under 35 U.S.C. 154(b) by 74 days.

(21) Appl. No.: 12/907,634

(22) Filed: Oct. 19, 2010

(65) Prior Publication Data

US 2012/0094679 A1 Apr. 19, 2012

(51) Int. Cl.
*H04W 4/00* (2009.01)

(52) U.S. Cl.
USPC .............. 455/434; 455/432.1; 455/432.3; 455/435.3; 455/440; 455/441; 370/331; 370/338

(58) Field of Classification Search .............. 455/404.2, 455/422.1, 456.1, 432.1, 432.3, 433, 434, 455/435.1, 435.2, 435.3, 436–444; 370/328–334
See application file for complete search history.

(56) References Cited

U.S. PATENT DOCUMENTS

| 7,027,816 B2* | 4/2006 | Kikuma et al. | 455/444 |
| 7,924,787 B2* | 4/2011 | Lee | 370/331 |
| 2009/0143078 A1* | 6/2009 | Tu et al. | 455/456.3 |
| 2010/0069070 A1* | 3/2010 | Shi et al. | 455/436 |
| 2012/0008593 A1* | 1/2012 | Randriamasy et al. | 370/331 |

OTHER PUBLICATIONS

3GPP TS 36.331—Version 9.0.0 Release 9 "LTE; Evolved Universal terrestrial Radio Access (E-UTRA); Radio Resource Control (RRC)"; Oct. 2009; pp. 1-51.*
Chengshan Xiao, "Mobile Speed Estimation for TDMA Based Hierarchical Cellular Systems", IEEE Transactions on Vehicular Tech. vol. 50. No. 4 Jul. 2001, pp. 981-991, XP002667362.
CSELT: "Criteria for Cell Selection/Reselection Algorithm", TSG RAN Wrkg Grp 2 Meeting 4, May 25, 1999, 7PP, XP002667363.
PCT/US2011/055401 International Search Report and the Written Opinion of the International Searching Authority, or the Declaration dated Feb. 2, 2012.

* cited by examiner

*Primary Examiner* — Jinsong Hu
*Assistant Examiner* — Magdi Elhag
(74) *Attorney, Agent, or Firm* — J. K. Jacobs

(57) ABSTRACT

Various methods are provided to address some of the current issues in selecting a carrier frequency. Some embodiments include estimating (101) a speed at which a mobile device is moving, determining (102) relative scanning priorities for different carrier frequencies based upon the estimated speed of the mobile device, and sending (103) an indication of the relative scanning priorities for the different carrier frequencies to the mobile device. By determining carrier frequency scanning priorities based upon the estimated speed of a mobile, throughput can be improved over that attained by present-day carrier frequency selection techniques.

16 Claims, 3 Drawing Sheets

DETERMINATION OF CARRIER FREQUENCY SCANNING PRIORITY IN COMMUNICATIONS

FIELD OF THE INVENTION

The present invention relates generally to communications and, in particular, to determining carrier frequency scanning priority in communications.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

3GPP LTE (Long Term Evolution) uses channel aware scheduling on both the uplink and the downlink, meaning that the base station scheduler uses an estimate of the instantaneous channel state information in order to optimally schedule users and allocate data rates to them. The channel state information is made available to the base station scheduler through Channel Quality Indicators (CQI) fed back in the uplink by the mobile for scheduling in the downlink, and by periodic wideband Sounding Reference Signal (SRS) transmission by the mobile in the uplink for uplink scheduling.

When the Doppler of the mobile becomes high, the accuracy of the channel state information obtained from the CQI and the SRS becomes degraded, and performance degrades rapidly. The Doppler is related to the mobile speed through the relationship: $\Delta=fv/c$, where f is the carrier frequency in Hz, v is the velocity of the mobile in meters per second, and c is the speed of light in meters per second. So the Doppler can become high if the mobile is moving at a higher speed for a given carrier frequency or is using a higher carrier frequency for a given speed.

Operators in the United States primarily own two carrier frequencies for 3GPP LTE, namely at a carrier frequency of 700 MHz and at a frequency of 2.1 GHz downlink/1.7 GHz uplink, the latter is called the Advanced Wireless Services (AWS) band. Similarly in Europe, operators will be deploying LTE in both the new 2.6 GHz band made available for LTE, but also eventually in lower frequencies such as the 900 MHz band as this spectrum is re-farmed from the currently used GSM.

New mechanisms and techniques that are able to help operators better utilize the different carriers on which they operate are clearly desirable and would advance communications generally.

Figure 1:
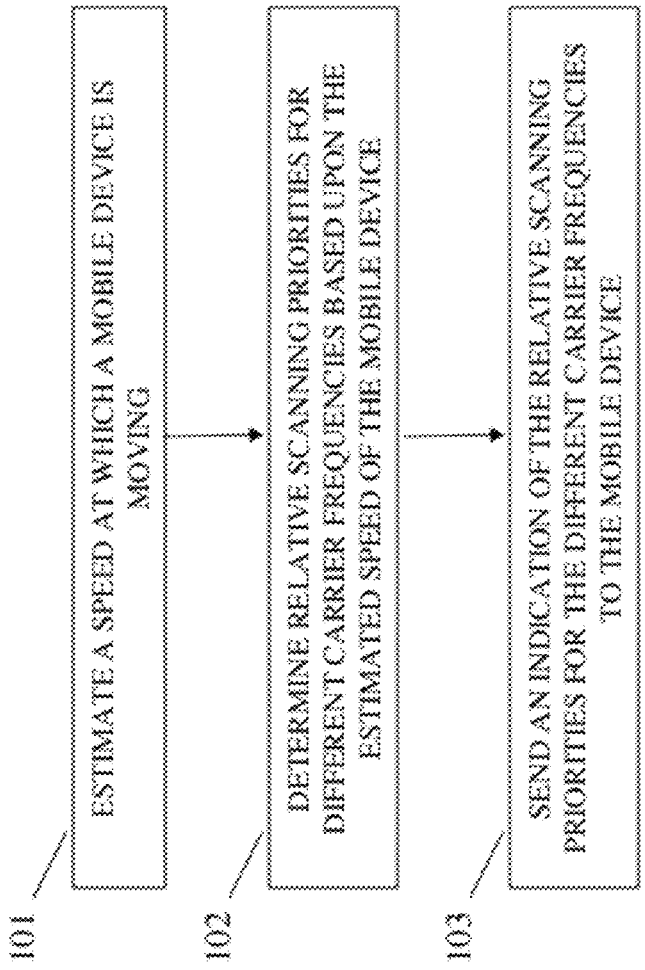
FIG. 1 is a logic flow diagram of functionality performed in accordance with various embodiments of the present invention.

Specific embodiments of the present invention are disclosed below with reference to FIGS. 1-3. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods are provided to address some of the current issues in selecting a carrier frequency. One method includes estimating a speed at which a mobile device is moving, determining relative scanning priorities for different carrier frequencies based upon the estimated speed of the mobile device, and sending an indication of the relative scanning priorities for the different carrier frequencies to the mobile device. An article of manufacture is also provided, the article comprising a processor-readable storage medium storing one or more software programs which when executed by one or more processors performs the steps of this method.

Many embodiments are provided in which the method above is modified. For example, in many embodiments the different carrier frequencies include a lower carrier frequency and a higher carrier frequency, the lower carrier frequency corresponding to a lower frequency band than the higher carrier frequency corresponds. Depending on the embodiment, determining the relative scanning priorities may involve a variety of different activities. For example, it may involve assigning a higher scanning priority to the higher carrier frequency than to the lower carrier frequency, if the estimated speed of the mobile device is above a high-speed threshold. It may also, or alternatively, involve assigning a higher scanning priority to the higher carrier frequency than to the lower carrier frequency, if the estimated speed of the mobile device is below a low-speed threshold (where the low-speed threshold corresponds to a lower speed than the high-speed threshold corresponds). It may also, or alternatively, involve assigning a higher scanning priority to the lower carrier frequency than to the higher carrier frequency, if the estimated speed of the mobile device is below a high-speed threshold. It may also, or alternatively, involve assigning a higher scanning priority to the lower carrier frequency than to the higher carrier frequency, if the estimated speed of the mobile device is below a high-speed threshold and above a low-speed threshold (where the low-speed threshold corresponds to a lower speed than the high-speed threshold corresponds). In embodiments that utilize both a low-speed threshold and a high-speed threshold, determining the relative scanning priorities may involve assigning a higher scanning priority to the lower carrier frequency than to the higher carrier frequency, if the estimated speed of the mobile device is within a range bounded by the low-speed threshold and the high-speed threshold.

A transceiver node apparatus is also provided. The transceiver node being configured to communicate with other devices in the system and being operative to estimate a speed at which a mobile device is moving, to determine relative scanning priorities for different carrier frequencies based upon the estimated speed of the mobile device, and to send an indication of the relative scanning priorities for the different carrier frequencies to the mobile device. Many embodiments are provided in which the transceiver node is modified to be operative to perform the method, and its various embodiments, described above.

DETAILED DESCRIPTION OF EMBODIMENTS

To provide a greater degree of detail in making and using various aspects of the present invention, a description of our approach to determining carrier frequency scanning priorities and a description of certain, quite specific, embodiments follows for the sake of example.

Operators will typically have a lower carrier frequency and higher carrier frequency on which LTE will be operating in any given market, and it is advantageous for these operators to ensure that mobiles with a moderately high speed connect to the lower carrier frequency (e.g., 700 MHz, 900 MHz), where the channel state information is still accurate due to the lower Doppler for a given speed, rather than connecting to the higher carrier frequency (e.g. 2.1 GHz, 2.6 GHz) where the Doppler is higher and may be in a range where the channel state information is inaccurate, leading to degraded performance. The higher carrier frequency can be used for mobiles who are relatively stationary or moving at very low speed (e.g. pedestrian traffic), or for mobiles who are moving at such a high speeds that even the lower carrier frequency would also suffer degraded performance due to too high a Doppler.

It is too expensive from a signaling point of view to first wait for a user to attach and begin transmitting on a given carrier frequency before determining its velocity, and then initiate an active mode inter-frequency handover. Instead, it is more desirable to have the mobiles automatically connect to the more desirable carrier frequency directly from idle mode based on the mobile speed.

The air interface performance of 3GPP LTE (Long Term Evolution) generally improves the lower the Doppler of the mobile, due to the fact that channel aware scheduling can be used effectively. Graph 300 of FIG. 3 and Table 1 illustrate the result of a multi-cell, multi-user system simulation of the 3GPP LTE uplink for a 10 MHz carrier bandwidth, which has 8 full buffer users per cell with 36 cells, with an Extended Typical Urban channel model, and a 10% initial BLER target. Graph 300 depicts the sector throughput that is achieved for different mobile speeds, for both a 700 MHz carrier frequency and a 1700 MHz carrier frequency (which is the uplink carrier frequency of the AWS band).

TABLE 1

Performance as a function of mobile speed and carrier frequency.

| UE Speed (km/hr) | Sector Throughput (Mbps) 1700 MHz | Sector Throughput (Mbps) 700 MHz | % Gain of 700 MHz over 1700 MHz |
|---|---|---|---|
| 3 | 7.1 | 7.2 | 1.4% |
| 10 | 5.7 | 6.8 | 19.3% |
| 30 | 3.5 | 5.2 | 48.6% |
| 60 | 3.5 | 3.7 | 5.7% |
| 120 | 3.5 | 3.5 | 0.0% |

Note that for low mobile speeds (3 km/hr or less), the performance of the two carrier frequencies are similar, because even with the higher carrier frequency the Doppler is low enough for channel state information to be accurate and allow for good channel aware scheduling to take place. For high mobile speeds (greater than 60 km/hr), again both carrier frequencies perform similarly, because the Doppler is high enough such that even for the lower carrier frequency the channel aware scheduling cannot be done well, resulting in poor performance of both carrier frequencies. In between these two speeds (greater than 3 km/hr and less than 60 km/hr), we see the lower carrier frequency of 700 MHz can provide a significant improvement in performance over the higher 1700 MHz carrier frequency (almost 50% improvement at 30 km/hr).

Once a mobile is connected and actively transmitting data to a particular base station, that the base station can obtain an estimate of the mobile's speed by examining the correlation properties of the transmitted signal by the mobile. As an example, in 3GPP LTE, the mobile transmits two pilot symbols spaced 0.5 milliseconds apart in every packet transmission, and the base station can compute the correlation between the channel estimates derived from these two pilot symbols, and together with knowledge of the operating carrier frequency, can determine the mobiles speed. Note that the estimation of the mobile's speed in this manner is possible while the mobile is in what is known as RRC (radio resource control) connected mode, meaning it is actively exchanging data with the network.

A mobile is in RRC idle mode when it has not had any data to transmit for a relatively long period of time (tens of seconds, for example). In RRC idle, the mobile periodically powers on its transceiver and measures the downlink signal strength on nearby base stations on various carrier frequencies which have been pre-configured in the device.

The preference for a particular carrier frequency for the mobile to attempt to connect to from RRC idle mode is determined from an internal frequency priority list. This list contains the different carrier frequencies the mobile should scan for, and has a priority value (8 values from 0 to 7, 0 being the lowest priority) assigned to each frequency to indicate which carrier frequency the mobile should prefer to connect to. The mobile will begin by making measurements on the highest priority carrier frequency in its frequency priority list, and if the carrier frequency meets the minimum required quality levels (signal strength, signal to interference ratio, etc.), then the mobile will camp on that carrier frequency. If no base stations meet the minimum required quality levels on that carrier, the mobile moves to the next highest priority carrier frequency and again makes measurements until it finds a carrier frequency for which a base station meets the minimum required quality level to camp on. By camping on a base station's carrier, we mean that a mobile listens for a paging message from this base station or initiates a connection procedure to this base station if data appears in the buffer of the mobile. When data needs to be transmitted, the mobile will connect to the carrier frequency it was camped on. See 3GPP TS 36.304.

The priorities of the carrier frequency in the frequency priority list are configured to a default value and sent via broadcast signaling to all mobiles (say an operator has more spectrum available in one carrier compared to another). At present, there is no technique to influence which carrier frequency a mobile decides to attach to when in RRC idle mode based on the mobile speed, so you may have a mobile moving at a relatively high speed (say 30 km/hr) that chooses to connect to the higher carrier frequency, which we have seen from the simulation results is suboptimal from a performance point of view.

Thus, the mobile connects to whatever cell it deems best, and then based on speed measurements of this mobile while it is in RRC connected mode, the base station can decide to initiate an inter-frequency handover by signaling the mobile to tune to a different carrier frequency, and then the mobile must go through the air interface connection procedure on the new carrier frequency. This process introduces delay in the mobile's data transfer as it can take on the order of 100-200 milliseconds to switch carrier frequencies, and the network must bear additional signaling load for this transfer to happen.

To reduce the occurrences of such inter-frequency handovers, we propose enabling the mobile to select a particular carrier frequency directly from RRC idle mode based on its speed. For example, we propose that each time a mobile is in RRC connected mode with a particular base station that the base station make a speed measurement on this mobile. When the mobile is about to disconnect from the base station and transition back to RRC Idle mode (e.g., because there has been no data transmission for a certain period of time), the procedure in 3GPP LTE is that the base station sends the mobile an RRC connection release message, as described in 3GPP TS 36.331.

The RRC connection release message contains in it an IdleModeMobilityControlInfo information element, of which one element is freqPriorityListEUTRA. This is a list of carrier frequencies with associated priorities which the mobile should scan for when it goes back into RRC idle mode, and the 3GPP LTE standard allows the base station to reconfigure the priorities of the different carrier frequencies and send it to the mobile to use when it goes back into RRC idle via this dedicated signaling method (i.e. through the RRC connection release message).

We propose that the base station set the priorities in the frequency priority list based on its current estimate of the mobile speed. More specifically, the priorities are set in such a way that if the base station determines this mobile is moving within a particular speed range, the priority of the lower carrier frequency is set to be higher than the priority of the higher carrier frequency. Similarly, if the mobile is moving outside the particular speed range, then the priority of the higher carrier frequency is set to be higher than the priority of the lower carrier frequency.

Using the example above, we would set the priority of the 700 MHz carrier frequency higher (for example, set to a priority value of 7) than the priority of the 1700 MHz AWS carrier (for example, set to a priority value of 0) if the mobile speed measured by the base station is above 3 km/hr and less than 60 km/hr. We would set the priority of the AWS carrier higher (for example, set to a priority value of 7) than that of the 700 MHz carrier (for example, set to a priority value of 0) if the mobile speed is less than 3 km/hr or more than 60 km/hr. While the performance of the 700 MHz carrier and AWS carrier is similar in this range, for the purposes of load balancing we would choose the AWS carrier in order to leave room on the 700 MHz carrier for mobiles in the 3 km/hr to 60 km/hr speed range.

We point out that the mobile will enter RRC connected mode anytime there is actual data traffic that needs to be exchanged with the network, and also anytime the mobile goes through a tracking area update (TAU) procedure, which is either triggered periodically when a timer expires in the mobile, or when the mobile crosses into a new tracking area. During the TAU, the mobile moves from RRC idle into RRC connected in order to signal its presence in the new tracking area to the mobility management entity (MME) via the base station, then moves back to RRC idle state, at which time the RRC connection release message is sent to the mobile. So even if a mobile has had no data to exchange with the network for quite some time, we will still be able to make speed estimates and configure the frequency priority list in the mobile which is transmitted in the RRC connection release message which takes place at the end of the TAU procedure.

The detailed and, at times, very specific description above is provided to effectively enable a person of skill in the art to make, use, and best practice the present invention in view of what is already known in the art. In the examples, the present invention is described in the context of specific architectures, specific system configurations and specific wireless signaling technologies for the purpose of illustrating possible embodiments and a best mode for the present invention. Thus, the examples described should not be interpreted as restricting or limiting the scope of the broader inventive concepts.

Figure 2:
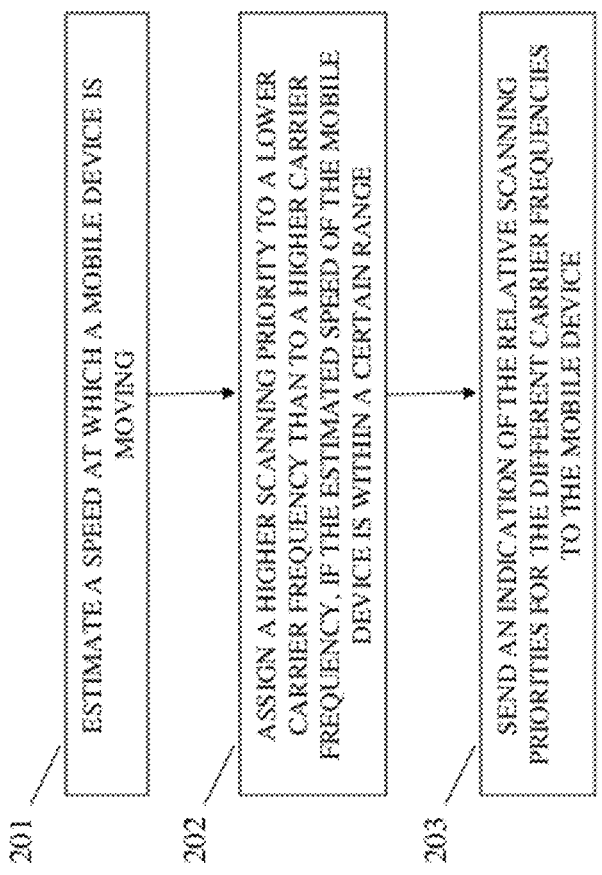
FIG. 2 is a logic flow diagram of functionality performed in accordance with some more detailed embodiments of the present invention.
Figure 3:
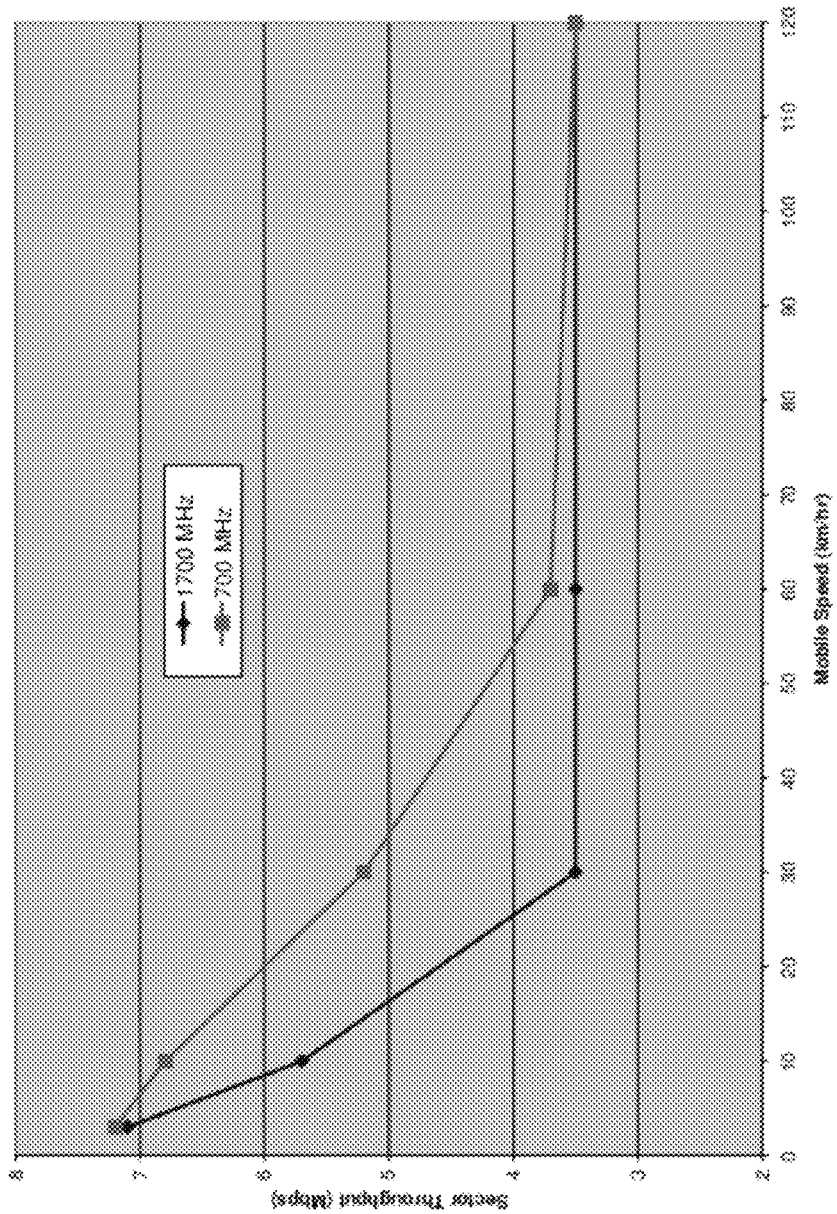
FIG. 3 is a graph depicting throughput performance as a function of mobile speed and carrier frequency.

Having described certain embodiments in detail above, a review of the more general aspects common to many of the embodiments of the present invention can be understood with reference to FIGS. 1-2. FIG. 1 is a logic flow diagram of functionality performed in accordance with various embodiments of the present invention. In the method depicted in diagram 100, the speed of a mobile device is estimated (101). Relative scanning priorities for different carrier frequencies are then determined (102) based upon the estimated speed of the mobile device. An indication of the relative scanning priorities for the different carrier frequencies is then sent (103) to the mobile device.

A variety of different embodiments are proposed in which the determining of the relative scanning priorities is performed in different ways. For example, in many embodiments the different carrier frequencies include a lower carrier frequency and a higher carrier frequency, the lower carrier frequency corresponding to a lower frequency band than the higher carrier frequency corresponds. Also, depending on the embodiment, either a single or a multiple speed threshold may be used in the determining of the relative scanning priorities.

For example, determining the relative scanning priorities may involve assigning a higher scanning priority to the higher carrier frequency than to the lower carrier frequency, if the estimated speed of the mobile device is above a high-speed threshold. It may also, or alternatively, involve assigning a higher scanning priority to the higher carrier frequency than to the lower carrier frequency, if the estimated speed of the mobile device is below a low-speed threshold (where the low-speed threshold corresponds to a lower speed than the high-speed threshold corresponds). It may also, or alternatively, involve assigning a higher scanning priority to the lower carrier frequency than to the higher carrier frequency, if the estimated speed of the mobile device is below a high-speed threshold. It may also, or alternatively, involve assigning a higher scanning priority to the lower carrier frequency than to the higher carrier frequency, if the estimated speed of the mobile device is below a high-speed threshold and above a low-speed threshold (where the low-speed threshold corresponds to a lower speed than the high-speed threshold corresponds).

FIG. 2 is a logic flow diagram of functionality performed in accordance with some more detailed embodiments of the present invention. In the method depicted in diagram 200, both a low-speed threshold and a high-speed threshold are utilized in determining the relative scanning priorities. The speed of a mobile device is estimated (201) and then relative scanning priorities for different carrier frequencies are determined based upon the estimated speed of the mobile device. Specifically, a higher scanning priority is assigned (202) to the lower carrier frequency than to the higher carrier frequency, if the estimated speed of the mobile device is within a range bounded by the low-speed threshold and the high-speed threshold. An indication of the relative scanning priorities for the different carrier frequencies is then sent (203) to the mobile device.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two.

The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method, comprising:
   estimating a speed at which a mobile device is moving;
   determining relative scanning priorities for different carrier frequencies based upon the estimated speed of the mobile device;
   sending an indication of the relative scanning priorities for the different carrier frequencies to the mobile device,
   wherein the different carrier frequencies comprise a lower carrier frequency and a higher carrier frequency, the lower carrier frequency corresponding to a lower frequency band than the higher carrier frequency corresponds, and
   wherein determining the relative scanning priorities comprises assigning a higher scanning priority to the higher carrier frequency than to the lower carrier frequency, if the estimated speed of the mobile device is above a high-speed threshold.

2. The method as recited in claim 1, wherein determining the relative scanning priorities comprises
   assigning a higher scanning priority to the higher carrier frequency than to the lower carrier frequency, if the estimated speed of the mobile device is below a low-speed threshold, wherein the low-speed threshold corresponds to a lower speed than the high-speed threshold corresponds.

3. The method as recited in claim 1, wherein determining the relative scanning priorities comprises
   assigning a higher scanning priority to the lower carrier frequency than to the higher carrier frequency, if the estimated speed of the mobile device is below a high-speed threshold.

4. The method as recited in claim 1, wherein determining the relative scanning priorities comprises
   assigning a higher scanning priority to the lower carrier frequency than to the higher carrier frequency, if the estimated speed of the mobile device is below a high-speed threshold and above a low-speed threshold, wherein the low-speed threshold corresponds to a lower speed than the high-speed threshold corresponds.

5. The method as recited in claim 1, wherein determining the relative scanning priorities comprises
   assigning a higher scanning priority to the lower carrier frequency than to the higher carrier frequency, if the estimated speed of the mobile device is within a range bounded by a low-speed threshold and a high-speed threshold.

6. The method as recited in claim 1, wherein sending the indication of the relative scanning priorities for the different carrier frequencies to the mobile device comprises
   sending the indication of the relative scanning priorities for the different carrier frequencies to the mobile device in a connection release message.

7. The method as recited in claim 6, wherein sending the indication in the connection release message comprises
   sending a priority value for each of the different carrier frequencies in an information element of the connection release message.

8. An article of manufacture comprising a non-transitory processor-readable storage medium storing one or more software programs which when executed by one or more processors performs the steps of the method of claim 1.

9. A transceiver node of a communication system, the transceiver node being configured to communicate with other devices in the system, wherein the transceiver node is operative
   to estimate a speed at which a mobile device is moving,
   to determine relative scanning priorities for different carrier frequencies based upon the estimated speed of the mobile device, and
   to send an indication of the relative scanning priorities for the different carrier frequencies to the mobile device,
   wherein the different carrier frequencies comprise a lower carrier frequency and a higher carrier frequency, the lower carrier frequency corresponding to a lower frequency band than the higher carrier frequency corresponds, wherein being operative to determine the relative scanning priorities comprises
   being operative to assign a higher scanning priority to the higher carrier frequency than to the lower carrier frequency, if the estimated speed of the mobile device is above a high-speed threshold.

10. The transceiver node as recited in claim 9, wherein the transceiver node comprises a base station.

11. The transceiver node as recited in claim 9, wherein being operative to determine the relative scanning priorities comprises being operative to assign a higher scanning priority to the higher carrier frequency than to the lower carrier frequency, if the estimated speed of the mobile device is below a low-speed threshold, wherein the low-speed threshold corresponds to a lower speed than the high-speed threshold corresponds.

12. The transceiver node as recited in claim 9, wherein being operative to determine the relative scanning priorities comprises being operative to assign a higher scanning priority to the lower carrier frequency than to the higher carrier frequency, if the estimated speed of the mobile device is below a high-speed threshold.

13. The transceiver node as recited in claim 9, wherein being operative to determine the relative scanning priorities comprises being operative to assign a higher scanning priority to the lower carrier frequency than to the higher carrier frequency, if the estimated speed of the mobile device is below a high-speed threshold and above a low-speed threshold, wherein the low-speed threshold corresponds to a lower speed than the high-speed threshold corresponds.

14. The transceiver node as recited in claim 9, wherein being operative to determine the relative scanning priorities comprises being operative to assign a higher scanning priority to the lower carrier frequency than to the higher carrier frequency, if the estimated speed of the mobile device is within a range bounded by a low-speed threshold and a high-speed threshold.

15. The transceiver node as recited in claim 9, wherein being operative to send the indication of the relative scanning priorities for the different carrier frequencies to the mobile device comprises being operative to send the indication of the relative scanning priorities for the different carrier frequencies to the mobile device in a connection release message.

16. The transceiver node as recited in claim 15, wherein being operative to send the indication in the connection release message comprises being operative to send a priority value for each of the different carrier frequencies in an information element of the connection release message.

* * * * *